US005863158A

United States Patent [19]

Foshee, Jr. et al.

[11] Patent Number: 5,863,158

[45] Date of Patent: Jan. 26, 1999

[54] POWER DRILL LEVERAGE TOOL ASSEMBLY

[76] Inventors: George T. Foshee, Jr.; George Foshee, III; Homer W. Foshee, all of P.O. Box 545, Stevenson, Ala. 35772

[21] Appl. No.: 959,230

[22] Filed: Oct. 28, 1997

[51] Int. Cl.$^{6}$ .......... B23B 39/00

[52] U.S. Cl. .......... 408/92; 408/136; 408/712

[58] Field of Search .......... 408/92, 136, 712

[56] References Cited

U.S. PATENT DOCUMENTS

| | | | |
|---|---|---|---|
| 2,667,092 | 1/1954 | Schaffer | 408/92 |
| 2,695,525 | 11/1954 | Butenhoff | 408/92 |
| 3,250,153 | 5/1966 | Purkey | 408/712 |
| 3,698,827 | 10/1972 | Salfer | 408/92 |
| 3,784,315 | 1/1974 | O'Brien | 408/92 |
| 4,168,926 | 9/1979 | Belcourt | 408/92 |
| 4,442,905 | 4/1984 | Agoston | 408/712 |
| 4,585,376 | 4/1986 | Davenport, Sr. et al. | 408/136 |
| 5,322,397 | 6/1994 | Spear | 408/712 |

*Primary Examiner*—Steven C. Bishop
*Assistant Examiner*—Adesh Bhargava
*Attorney, Agent, or Firm*—Douglas E. Mackenzie

[57] ABSTRACT

A new Power Drill Leverage Tool Assembly for providing additional leverage force upon the power drill bit in engaging a material to be drilled or reamed. The inventive device includes a tool member having a first end, a second end, a casing engaging tool for engaging a power drill casing, and a casing hole engaging tool for engaging a power drill casing hole, a handle member attachable to the tool member at the first end, and a link chain attachable to the tool member second end and to the workpiece.

8 Claims, 2 Drawing Sheets

POWER DRILL LEVERAGE TOOL ASSEMBLY

BACKGROUND OF THE INVENTION

1. Field of the Invention

The present invention relates to force applying devices and more particularly pertains to a new Power Drill Leverage Tool Assembly for providing additional leverage force upon the power drill bit in engaging a material to be drilled or reamed.

2. Description of the Prior Art

The use of force applying devices is known in the prior art. More specifically, force applying devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art force applying devices include U.S. Pat. No. 4,168,926; U.S. Pat. No. 5,322,397; U.S. Pat. No. 4,740,119; U.S. Pat. No. 4,136,579; U.S. Pat. No. 4,991,893 and U.S. Pat. No. Des. 278,791.

While these devices fulfill their respective, particular objectives and requirements, the aforementioned patents do not disclose a new Power Drill Leverage Tool Assembly. The inventive device includes a tool member having a first end, a second end, a casing engaging tool for engaging a power drill casing, and a casing hole engaging tool for engaging a power drill casing hole, a handle member attachable to the tool member at the first end and a means for attaching the tool member second end to the workpiece.

In these respects, the Power Drill Leverage Tool Assembly according to the present invention substantially departs from the conventional concepts and designs of the prior art, and in so doing provides an apparatus primarily developed for the purpose of providing additional leverage force upon the power drill bit in engaging a material to be drilled or reamed.

SUMMARY OF THE INVENTION

In view of the foregoing disadvantages inherent in the known types of force applying devices now present in the prior art, the present invention provides a new Power Drill Leverage Tool Assembly construction wherein the same can be utilized for providing additional leverage force upon the power drill bit in engaging a material to be drilled or reamed.

The general purpose of the present invention, which will be described subsequently in greater detail, is to provide a new Power Drill Leverage Tool Assembly apparatus and method which has many of the advantages of the force applying devices mentioned heretofore and many novel features that result in a new Power Drill Leverage Tool Assembly which is not anticipated, rendered obvious, suggested, or even implied by any of the prior art force applying devices, either alone or in any combination thereof.

To attain this, the present invention generally comprises a tool member having a first end, a second end, a casing engaging tool for engaging a power drill casing, and a casing hole engaging tool for engaging a power drill casing hole, a handle member attachable to the tool member at the first end and a means for attaching the tool member second end to the workpiece.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Power Drill Leverage Tool Assembly apparatus and method which has many of the advantages of the force applying devices mentioned heretofore and many novel features that result in a new Power Drill Leverage Tool Assembly which is not anticipated, rendered obvious, suggested, or even implied by any of the prior art force applying devices, either alone or in any combination thereof.

It is another object of the present invention to provide a new Power Drill Leverage Tool Assembly which may be easily and efficiently manufactured and marketed.

It is a further object of the present invention to provide a new Power Drill Leverage Tool Assembly which is of a durable and reliable construction.

An even further object of the present invention is to provide a new Power Drill Leverage Tool Assembly which is susceptible of a low cost of manufacture with regard to both materials and labor, and which accordingly is then susceptible of low prices of sale to the consuming public, thereby making such Power Drill Leverage Tool Assembly economically available to the buying public.

Still yet another object of the present invention is to provide a new Power Drill Leverage Tool Assembly which provides in the apparatuses and methods of the prior art some of the advantages thereof, while simultaneously overcoming some of the disadvantages normally associated therewith.

Still another object of the present invention is to provide a new Power Drill Leverage Tool Assembly for providing additional leverage force upon the power drill bit in engaging a material to be drilled or reamed.

Yet another object of the present invention is to provide a new Power Drill Leverage Tool Assembly which includes a tool member having a first end, a second end, a casing engaging tool for engaging a power drill casing, and a casing hole engaging tool for engaging a power drill casing hole, a handle member attachable to the tool member at the first end and a means for attaching the tool member second end to the workpiece.

Still yet another object of the present invention is to provide a new Power Drill Leverage Tool Assembly that provides leverage to the power drill bit without the need for modifications to the power drill.

Even still another object of the present invention is to provide a new Power Drill Leverage Tool Assembly that is easily disassembled and stored.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
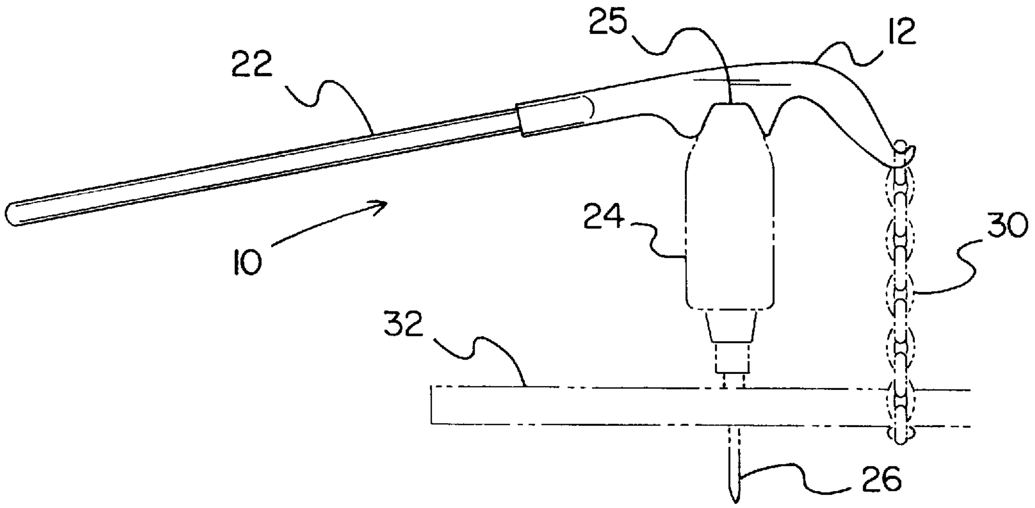
FIG. 1 is a side elevation view of a new Power Drill leverage Tool Assembly according to the present invention showing the casing engaging tool in use.
Figure 2:
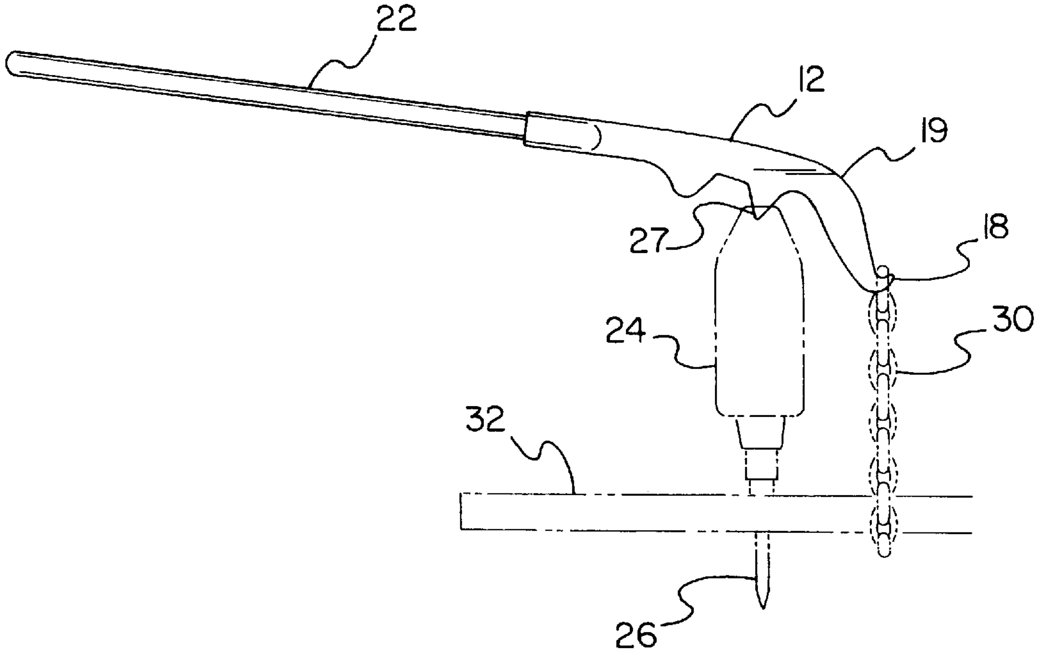
FIG. 2 is a side elevation view thereof showing the casing hole engaging tool in use.
Figure 3:
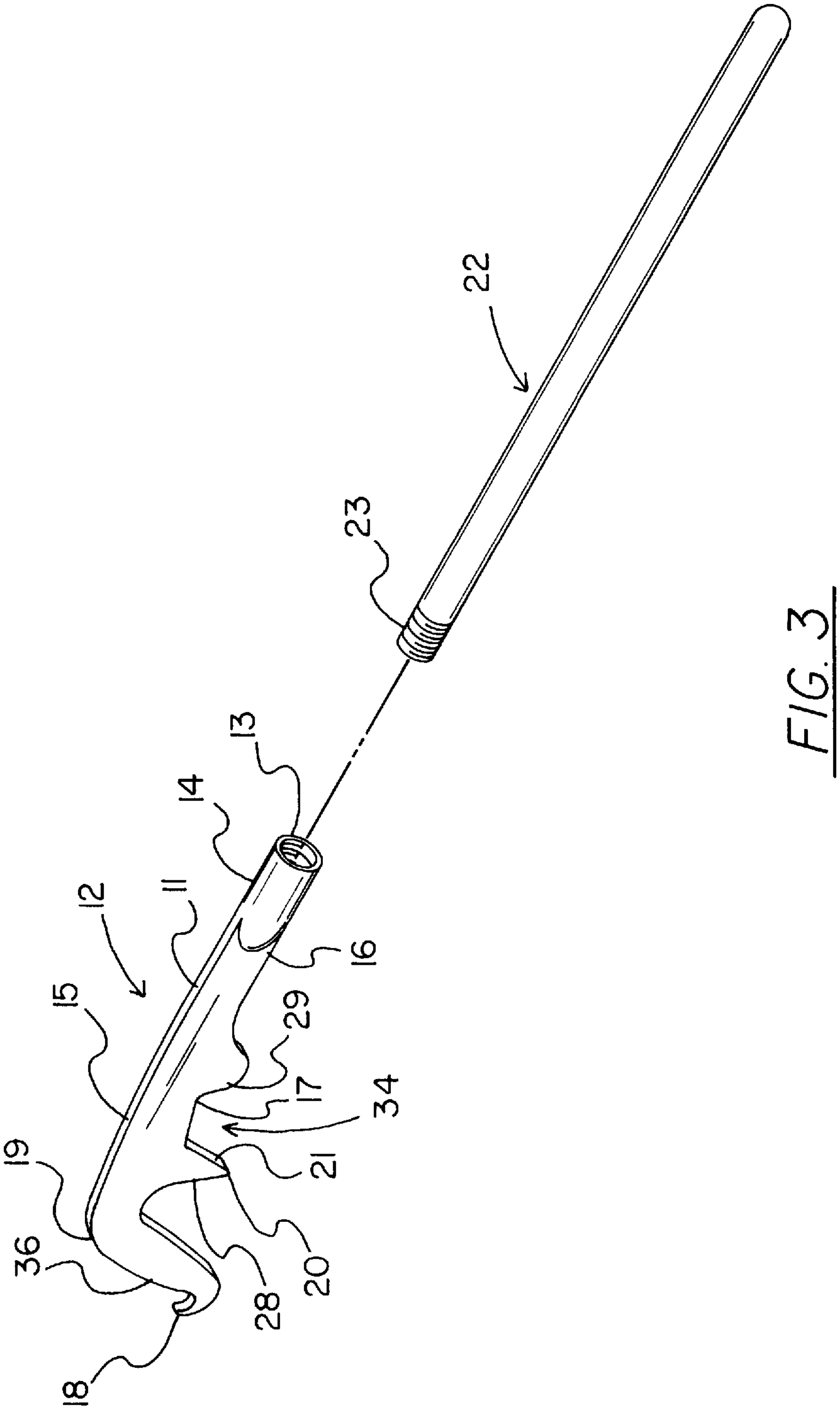
FIG. 3 is an exploded isometric illustration of the present invention.

With reference now to the drawings, and in particular to FIGS. 1 through 3 thereof a new Power Drill Leverage Tool Assembly embodying the principles and concepts of the present invention and generally designated by the reference numeral 10 will be described.

More specifically, it will be noted that the Power Drill Leverage Tool Assembly 10 comprises a tool member 12 having a first end 14, a second end 19, a casing engaging tool including a cavity 34, a casing hole engaging tool including a point 20 formed by two surfaces 21 and 28, a handle member 22 attachable to the tool member 12 at the tool member first end 14 and a link chain 30 for attaching the tool member second end 19 to the workpiece 32.

With reference to FIG. 1 there is shown the tool member 12 engaging the power drill casing 25 of a power drill 24 so as to impart a leverage force along the axis of rotation of the drill bit 26 by means of applying a downward force upon the handle member 22. The link chain 30 which is shown attached to the workpiece 32 and to the tool member 12 limits the movement of the tool member 12.

With reference to FIG. 2 the tool member 12 is shown engaging the power drill casing hole 27, such as found on many power drill casings, so as to impart a leverage force along the axis of rotation of the power drill bit 26 by means of applying a downward force upon the handle member 22. In similar fashion, the link chain 30 which is shown attached to the workpiece 32 and to the tool member 12 limits the movement of the tool member 12.

With reference to FIG. 3 there is shown the tool member 12 including a tool member first end 14 and a tool member second end 19. A casing engaging tool including a cavity 34 is shown formed on a bottom portion 16 of the tool member 12. A first surface 17 is shown formed substantially parallel to a top portion 15. A second surface 29 is shown formed at an obtuse angle relative to the first surface 17. A third surface 21 is shown formed at an obtuse angle relative to the first surface 17. The first surface 17 is disposed intermediate the second surface 29 and the third surface 21 and the first, second and third surfaces 17, 29, and 21 form the cavity 34 for engaging the power drill casing 25.

With continued reference to FIG. 3 a fourth surface 28 formed at an acute angle adjacent to the third surface 21 forms the casing hole engaging tool including a point 20 formed at the meeting of the fourth surface 28 and the third surface 21. A hook member 36 is shown integrally formed at the tool member second end 19 and includes a hook 18 formed at an end thereof.

The handle member 22 is shown including a threaded end 23 for threading engagement to a threaded bore 13 formed at the tool member first end 14.

In use, the inventive device is assembled by threading the threaded end 23 of the handle member 22 to the threaded bore 13 of the tool member 12. The link chain 30 is either wrapped around the workpiece 32 or otherwise attached thereto and attached to the hook 18. If the power drill being utilized has a casing hole 27, then the point 20 is inserted therein, otherwise the cavity 34 is positioned over the power drill casing 25. The position of the chain is adjusted such that the tool being utilized imparts a leverage force along the axis of rotation of the drill bit 26 with the application of a downward force upon the handle member 22 which is held in one hand while the other operates the power drill.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Power Drill Leverage Tool Assembly for use in leveraging a power drill bit in engaging a workpiece comprising:

a tool member having a first end, a second end, a casing engaging tool for engaging a power drill casing in a first mode of operation, and a casing hole engaging tool for engaging a power drill casing hole in a second mode of operation;

where the casing engaging tool and the casing hole engaging tool do not engage the power drill simultaneously; and a handle member attachable to the tool member at the tool member first end; and a means for attaching the tool member second end to the workpiece.

2. The Power Drill Leverage Tool Assembly of claim 1, wherein the means for attaching the tool member second end to the workpiece further comprise a link chain attachable to the workpiece and to a hook integrally formed at the tool member second end.

3. The Power Drill Leverage tool Assembly of claim 2, wherein the tool member further comprises a top portion and a bottom portion, the casing engaging and casing hole engaging tools formed on the bottom portion.

4. The Power Drill Leverage Tool Assembly of claim 3, wherein the casing engaging tool further comprises a first surface substantially parallel to the top portion, a second surface formed at an obtuse angle relative to the first surface, and a third surface formed at an obtuse angle relative to the first surface, the first surface being disposed intermediate the second and third surfaces and the first, second, and third surfaces forming a cavity for engaging the power drill casing.

5. The Power Drill Leverage Tool Assembly of claim 4, wherein the casing hole engaging tool further comprises a fourth surface formed at an acute angle adjacent the third surface, the third and fourth surfaces meeting at a point for engaging the power drill casing hole.

6. The Power Drill Leverage Tool Assembly of claim 5, wherein the handle member further comprises a threaded end, the threaded end being threadingly receivable in a threaded bore formed in the tool member first end.

7. The Power Drill Leverage Tool Assembly of claim 6, wherein the tool member further comprises a hook member integrally formed at the tool member second end, the hook member having the hook formed at an end thereof.

8. The Power Drill Leverage Tool Assembly of claim 7, wherein the casing hole engaging tool is formed intermediate the casing engaging tool and the hook member.

* * * * *